United States Patent [19]
Kitchen et al.

[11] Patent Number: 6,083,110
[45] Date of Patent: Jul. 4, 2000

[54] VERTICAL WIND TUNNEL TRAINING DEVICE

[75] Inventors: William J. Kitchen, Celebration, Fla.; Michael Palmer, Poquoson, Va.

[73] Assignee: Sky Venture, Inc., Celebration, Fla.

[21] Appl. No.: 09/324,282

[22] Filed: Jun. 2, 1999

Related U.S. Application Data

[63] Continuation-in-part of application No. 09/159,369, Sep. 23, 1998, abandoned.

[51] Int. Cl.[7] .................................................. A63G 31/00
[52] U.S. Cl. .............................. 472/49; 472/50; 472/136; 434/34; 73/147
[58] Field of Search ............................... 472/49, 50, 131, 472/136; 73/147; 138/45; 434/34, 252, 258, 247

[56] References Cited

U.S. PATENT DOCUMENTS

| | | | |
|---|---|---|---|
| 2,486,287 | 10/1949 | Jackson | 138/45 |
| 2,560,634 | 7/1951 | Colley | 138/45 |
| 2,788,020 | 4/1957 | Davie | 138/45 |
| 2,799,161 | 7/1957 | Greene et al. | 73/147 |
| 2,933,922 | 4/1960 | Davis | 73/147 |
| 4,308,748 | 1/1982 | Jacocks | 73/147 |
| 4,457,509 | 7/1984 | St-Germain | 472/68 |
| 4,487,410 | 12/1984 | Sassak . | |
| 4,578,037 | 3/1986 | Macangus et al. | 434/258 |
| 4,700,565 | 10/1987 | Albuschkat | 73/147 |
| 5,046,358 | 9/1991 | Wulf et al. | 73/147 |
| 5,209,702 | 5/1993 | Arenas | 472/136 |
| 5,417,615 | 5/1995 | Beard . | |
| 5,452,609 | 9/1995 | Bouis . | |
| 5,593,352 | 1/1997 | Methfessel et al. | 472/50 |
| 5,655,909 | 8/1997 | Kitchen . | |
| 5,753,811 | 5/1998 | Consolini | 73/147 |

FOREIGN PATENT DOCUMENTS

PCT/GB82/ 00298  10/1982  United Kingdom .

OTHER PUBLICATIONS

Compressible Flow Wind Tunnel; Lockheed Aeronautical Systems Company, Marietta, Georgia.

AGARD Memorandum; Advisory Group for Aeronautical Research and Development, Paris, France 1954.

Guide for Planning Investigations in the Ames 40– by 80–ft. Wind Tunnel; NASA Ames Research Center; Moffett Field, California, 1984.

*Primary Examiner*—Kien T. Nguyen
*Attorney, Agent, or Firm*—Rick Martin; Patent Law Offices of Rick Martin, P.C.

[57] ABSTRACT

The present invention is a vertical wind tunnel amusement device. The device comprises a flight chamber wherein a user may experience a freefall through the atmosphere from the safety of an enclosed flight chamber. Airflow sufficient to fully support a user within the flight chamber is induced by a plurality of fans connected above the flight chamber through a duct. A staging area having openings to the flight chamber is adjacent to the flight chamber. A user may enter or retreat from the flight chamber at will through the staging area openings without significantly adjusting the airflow velocity in the flight chamber. A control room is adjacent to the fight chamber whereby an operator may observe a user or users within the flight chamber and thereby safely control the operation of the fans. A projection room is also adjacent to the flight chamber whereby a video of a skydiving experience may be displayed to a user within the flight chamber. A telemetry backpack may be worn by a user or users in the flight chamber so the user can interact with or choose the scenes being projected on the flight chamber.

In alternate embodiment, return air ducts are used to return air from each fan to the wind tunnel inlet. Dampers are included on each return air duct thereby allowing the temperature of the airflow in the wind tunnel to be adjusted for user comfort.

36 Claims, 16 Drawing Sheets

VERTICAL WIND TUNNEL TRAINING DEVICE

REFERENCE TO RELATED APPLICATIONS

This application is a CIP of U.S. patent application Ser. No. 09/159,369 filed Sep. 23, 1998 now abandoned.

FIELD OF THE INVENTION

The present invention relates to the field of vertical wind tunnels, more particularly, to non-return flow vertical wind tunnels used as amusement devices.

BACKGROUND OF THE INVENTION

Wind tunnels are well known in the art. Wind tunnels are available in many types and styles depending upon the needs of the user. These include subsonic wind tunnels with and without return flow, transonic wind tunnels with and without return flow, vertical subsonic wind tunnels with and without return flow, supersonic and hypersonic wind tunnels with and without return flow, and compressible flow wind tunnels.

The majority of the wind tunnels are used for research and testing purposes. These include testing of conventional aircraft, helicopters, parachutes and other aerodynamic devices, wing surfaces, control surfaces, submarines, rockets and other launch vehicles, ground vehicles, buildings and other basic flow investigations.

The wind tunnels are generally owned by major defense oriented corporations, the Federal government, or educational institutions and universities. Although vertical wind tunnels are available for use by persons for various types of atmospheric freefall training, these wind tunnels are also generally controlled by the foregoing institutions for use only by authorized personnel. As a result, access to the wind tunnels is limited at best. These wind tunnels are not generally designed nor intended to be used by persons for the purpose of enjoyment or for learning to skydive. Consequently, none of these wind tunnels are used for general amusement purposes. None of these wind tunnels are available for use by essentially untrained people or by those with limited instruction. None of these wind tunnels are available to the public for use as an amusement ride. Further, the design of these prior art wind tunnels are not "user-friendly" for the purposes of use and enjoyment by users such as those who frequent amusement parks and the rides they offer. The prior art wind tunnels do not offer any means of enhancing the ride experience such as with a concurrent/interactive video presentation, nor do they offer a means of airflow control adopted to meet the needs of an operator providing thrill rides to the public.

Representative of the art is:

U.S. Pat. No. 2,486,287 to Jackson discloses an adjustable nozzle of a supersonic wind tunnel having fixed and moveable walls.

U.S. Pat. No. 2,560,634 to Colley discloses a Venturi tube having means for varying the throat area while the venturi is being used.

U.S. Pat. No. 2,788,020 to Davie discloses a linkage for effecting adjustment of a wind tunnel nozzle having moveable, flexible walls.

U.S. Pat. No. 2,799,161 to Greene et al. discloses trisonic wind tunnel having facilities for testing in subsonic, transonic, and supersonic speed ranges.

U.S. Pat. No. 2,933,922 to Davis discloses flexible nozzles for wind tunnels.

U.S. Pat. No. 4,308,748 to Jacocks discloses a wind tunnel having adjustable slats allowing close matching of the streamlines within the wind tunnel.

U.S. Pat. No. 4,487,410 to Sassak discloses an amusement apparatus comprising a spherical passenger holding body, and a vertical tube having a diameter sufficient to receive the body in a vertical path of motion.

U.S. Pat. No. 5,046,358 to Wulf et al. discloses a deformable plastic wall for use in a wind tunnel.

U.S. Pat. No. 5,417,615 to Beard discloses an air driven amusement ride which propels a passenger vehicle upward along a guide cable out of an acceleration tube by a blast of pressurized air within the tube under the vehicle.

U.S. Pat. No. 5,452,609 to Bouis discloses a wind tunnel having a plurality of wall surrounding a test section. The walls have a plurality of longitudinal slots, each channel created thereby having a flexible bottom.

U.S. Pat. No. 5,655,909 to Kitchen et al, discloses a skydiving trainer wind tunnel having a vertical air chamber with a video projection system on an interior wall.

University of Maryland, Glenn L. Martin Wind Tunnel Brochure.

Calspan Report No. WTO-300; 8-Foot Transonic Wind Tunnel; Calspan Corporation, Buffalo, N.Y.

Compressible Flow Wind Tunnel; Lockheed Aeronautical Systems Company, Marietta, Ga.

AGARD Memorandum; Advisory Group for Aeronautical Research and Development, Paris France, 1954.

Guide for Planning Investigations in the Ames 40- by 80-ft Wind Tunnel; NASA Ames Research Center; Moffett Field, Calif., 1984.

What is needed is a vertical wind tunnel amusement ride having a flight chamber on the inlet side of the fans for improved airflow control and stability. What is needed is a vertical wind tunnel amusement ride having an adjacent staging area. What is needed is a vertical wind tunnel amusement device having a plurality of fans. What is needed is a vertical wind tunnel amusement ride having a single pass non-return airflow. What is needed is a vertical wind tunnel amusement device having transparent windows looking into the flight chamber. What is needed is a vertical wind tunnel amusement device having transparent windows looking into the staging area. What is needed is a vertical wind tunnel amusement device having return air ducts with dampers to control the temperature of the airflow. The present invention meets these needs.

SUMMARY OF THE INVENTION

The primary aspect of the present invention is to provide a vertical wind tunnel amusement device having a flight chamber located on the inlet side of the fans for improved airflow control and stability.

Another aspect of the present invention is to provide a vertical wind tunnel amusement device having an adjacent staging area.

Another aspect of the present invention is to provide a vertical wind tunnel amusement device having a plurality of fans.

Another aspect of the present invention is to provide a vertical wind tunnel amusement device having transparent windows in the flight chamber.

Another aspect of the present invention is to provide a vertical wind tunnel amusement device having transparent windows in the staging area.

Another aspect of the present invention is to provide a vertical wind tunnel amusement device having a low profile to meet building constraints.

Another aspect of the present invention is to provide a vertical wind tunnel amusement device having a non-return airflow.

Another aspect of the present invention is to provide a vertical wind tunnel having a re-circulating airflow with dampers to control a temperature of the airflow.

Other aspects of this invention will appear from the following description and appended claims, reference being made to the accompanying drawings forming a part of this specification wherein like reference characters designate corresponding parts in the several views.

The invention comprises a single pass, non-return flow vertical wind tunnel amusement device having a flight chamber. It is within the flight chamber where the user experiences "freefall" within the vertical airflow column. Airflow is induced through the flight chamber by a plurality of fans located above, i.e. downstream of, the flight chamber. The fans are arranged radially about a major axis of the invention. The plurality of fans is driven by economics, from the standpoint that five industrial fans are a fraction of the cost, between one and two orders of magnitude, of a single fan large enough to support a user. Further, limiting the height of the structure using the radial diffuser encourages the use of several smaller fans versus a large single fan. A plurality of fans are also used so that in the event of a fan failure, the remaining fans can maintain the airflow through the flight chamber. The flow path through the invention begins at the inlet contraction. Ambient air is drawn into the inlet contraction starting with essentially zero velocity. The inlet contraction is aerodynamically designed to allow the incoming airflow to be accelerated to the optimum velocity with as little turbulence as possible. The airflow then passes through a floor mesh into the flight chamber. The floor mesh provides support for the users when the airflow through the flight chamber is not sufficient to support them. The flight chamber is approximately 12 feet in diameter. The airflow velocity in the flight chamber is approximately 120+ mph, which will fully support a user. The maximum airflow velocity in the flight chamber is approximately 175+ mph. Each wall of the flight chamber comprises windows constructed of transparent Plexiglas®, acrylic plastic, or similar high strength window material. The windows into the flight chamber are full length, thereby allowing an unrestricted view of the activities taking place within the flight chamber. Adjacent to the flight chamber is a staging area. The flight chamber has an entry opening and exit opening to the staging area through which a user may enter and exit the flight chamber. Users wait in the staging area for their turn in the flight chamber. In operation, the flight chamber may accommodate up to four users at a time, although the optimum number is two. In the preferred embodiment, a student will fly in the flight chamber with one instructor. The staging area has transparent windows so that an observer may view the flight of any person(s) within the flight chamber without entering the staging area. The remaining sides of the flight chamber comprise a window to the control room and windows for viewing the projection system. The control room is manned by a person operating the fans and projection system. The fans are controlled to achieve the optimum airflow velocity through the flight chamber. The projection system is used to project skydiving scenes for viewing by a user to enhance the flight experience. The upper section of the flight chamber comprises a perforated panel which is immediately above the staging area windows. This provides an alternate airflow path when users are entering and exiting the flight chamber. The airflow may pass through the entry and exit openings while a user is in the flight chamber. A portion of the airflow flows around a user, enters the staging area through the entry/exit openings and then re-enters the flight chamber at an elevation above the staging area. The perforated walls reduce the buoyancy tendencies which might result in a flyer going from the bottom to the top of the flight chamber immediately upon entry. This also results in added controllability and predictability of the supporting air column for a user. Next above the perforated section is a divergent diffuser. The divergent diffuser diverges at approximately 7 degrees from the major axis. The increasing cross-sectional area reduces the velocity of the airflow from the flight chamber to the fans. Next above the divergent diffuser are the fan inlets and the fans. The velocity of the airflow through the invention is controlled by either changing the pitch of the fans or by changing the rotational speed of the fans. The airflow passes through the fans and into the exit turning vanes. The fans are preferably axial flow fans, although any fan adapted for use in a wind tunnel is acceptable. The exit turning vanes turn the airflow path from substantially vertical to substantially horizontal. The airflow then enters and exits the delta shaped diffuser. The delta shaped diffusers are incorporated in a radial arrangement suited to the arrangement of the fans. The delta diffuser further diverges and slows the exhaust airflow from each fan. This results in an outlet airflow velocity of approximately 30 mph as compared to a velocity of 120+ mph within the flight chamber. The vertical wind tunnel amusement device also comprises a training area where users are instructed in the use of the wind tunnel and in the techniques of skydiving.

In an alternate embodiment, return air ducts are connected between the outlet of the fans and the inlet of the wind tunnel. Each return air duct has an outlet damper and an inlet damper. A portion of the airflow is blown out of the outlet damper. An equivalent portion of air is drawn into the inlet damper and then into the wind tunnel. This arrangement allows heated airflow air to be replaced with cooler ambient air, thereby allowing a user to adjust the temperature in the flight chamber for flyer comfort.

Before explaining the disclosed embodiment of the present invention in detail, it is to be understood that the invention is not limited in its application to the details of the particular arrangements shown, since the invention is capable of other embodiments. Also, the terminology used herein is for the purpose of description and not of limitation.

DESCRIPTION OF THE PREFERRED EMBODIMENT

Figure 1:
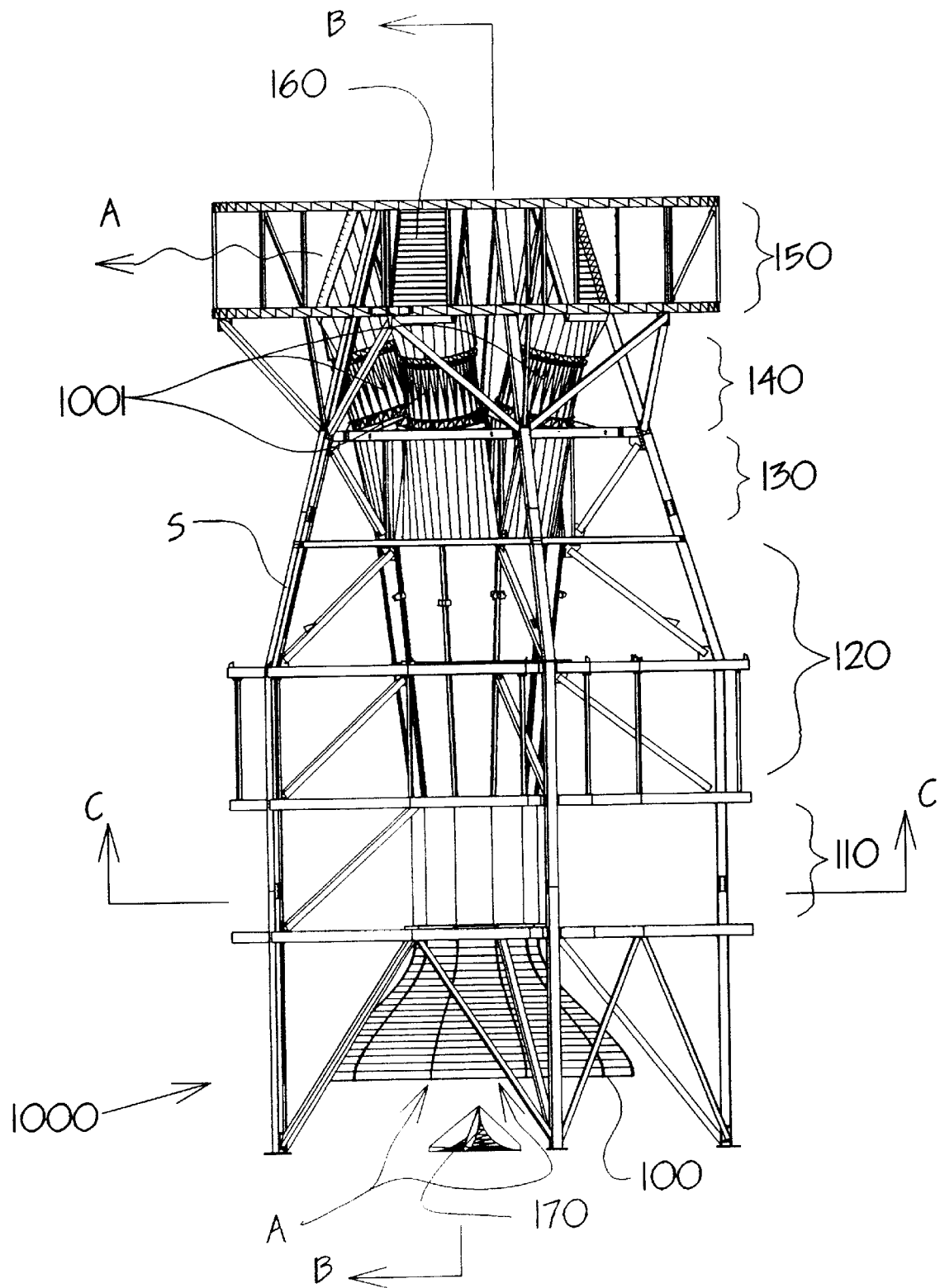
FIG. 1 a front elevation view of the preferred embodiment.

Reference is made to FIG. 1, a front elevation view of the preferred embodiment. The preferred embodiment comprises a vertical wind tunnel 1000 having a number of component parts. Inlet contraction 100 is connected to the lower end of the flight chamber 110. Diffuser 120 is immediately connected above the flight chamber 110. Connected above the diffuser 120 is transition 130 from diffuser 120 to the fans 140. Connected above fans 140 is the radial diffuser assembly 150. In operation, inlet contraction 100 allows the airflow A to be directed into the flight chamber 110 in a controlled manner. Anti-vortex device 170 prevents the formation of undesirable vortices or "tornadoes" in the inlet to the flight chamber. The means of design of the inlet contraction and its effects on the inlet airflow is well known in the art. The shape of the inlet contraction allows a relatively smooth airflow to enter the flight chamber. This reduces the amount of turbulence in the flight chamber, thereby adding to the enjoyment of the flight experience. It also results in a relatively flat airflow velocity profile across the width of the flight chamber. This eliminates areas of the flight chamber having differing airflow velocities which might otherwise cause the user to "fall off" the supporting airflow column. The airflow velocity through the flight chamber is in the range of zero to 140 mph, depending upon the prevailing atmospheric conditions and the characteristics of the person(s) within the flight chamber. It is within the flight chamber and in the lower section of the diffuser 120 that a user is fully suspended within the airflow column A. The preferred diameter range of the flight chamber is between 10 and 13 feet, although any diameter may be used assuming the proper size and number of fans are used. The preferred embodiment comprises five fans 1001 arranged radially about a major axis of the invention. Any number of fans may be used with the same result. The fans have to be powered by the proper HP motors as well as the correct size and number. The airflow path exits the flight chamber 110 and enters the diffuser section 120. Within the diffuser 120 the airflow velocity is slowed. This serves several purposes. The diffuser brings the airflow to the proper velocity to match the fan requirement. Further, the slowed airflow is no longer capable of supporting a user. Consequently, the invention has a "fail-safe" feature which prevents a user from approaching or being drawn into the fans. The slowed airflow also reduces the frictional losses in the flowpath, resulting in reduced fan size. Further, the diffuser serves as a means of aerodynamically connecting the fans to the flight chamber since the fans have a larger overall diameter than the flight chamber. Transition section 130 divides the airflow path from a single path in diffuser 120 to five airflow paths, resulting in a dedicated airflow path to each fan inlet. Vortex generators, known in the art, may be used at the transition between the diffuser 120 and the transition section 130 to further control the airflow. The fans discharge into the radial diffuser assembly 150. Radial diffuser assembly 150 comprises the exit turning vanes and delta shaped diffusers. It receives the airflow from the fans 140. In order to meet design requirements which may affect the physical arrangement of the invention, the radial diffuser assembly 150 comprises a series of exit turning vanes 160 (not shown) which results in a lower height profile of the invention. The airflow from the fans 140 is first turned from a substantially vertical direction to a substantially horizontal direction by exit turning vanes 160. The ductwork containing exit turning vanes 160 also diverges in the direction of the airflow, resulting in a reduction in the velocity of the airflow. This arrangement allows recovery of the static pressure in a manner which makes the system more efficient. It also reduces the noise level caused by the discharge airflow from the radial diffuser assembly. After the airflow exits the exit turning vanes 160 it is then routed through and discharged from the delta shaped diffusers (not shown). The delta shaped diffusers further diffuse and slow the velocity of the airflow to approximately 30 mph. This significantly reduces the noise level that would otherwise result from discharging the 125+ mph airflow present in the flight chamber directly to the atmosphere. The wind tunnel is supported by steel framework S which is designed according to techniques and standards known in the art. The steel framework S may also be integrally incorporated into the form of the wind tunnel itself so that it is not visually detectable by an observer in addition to the form of the wind tunnel.

Figure 2:
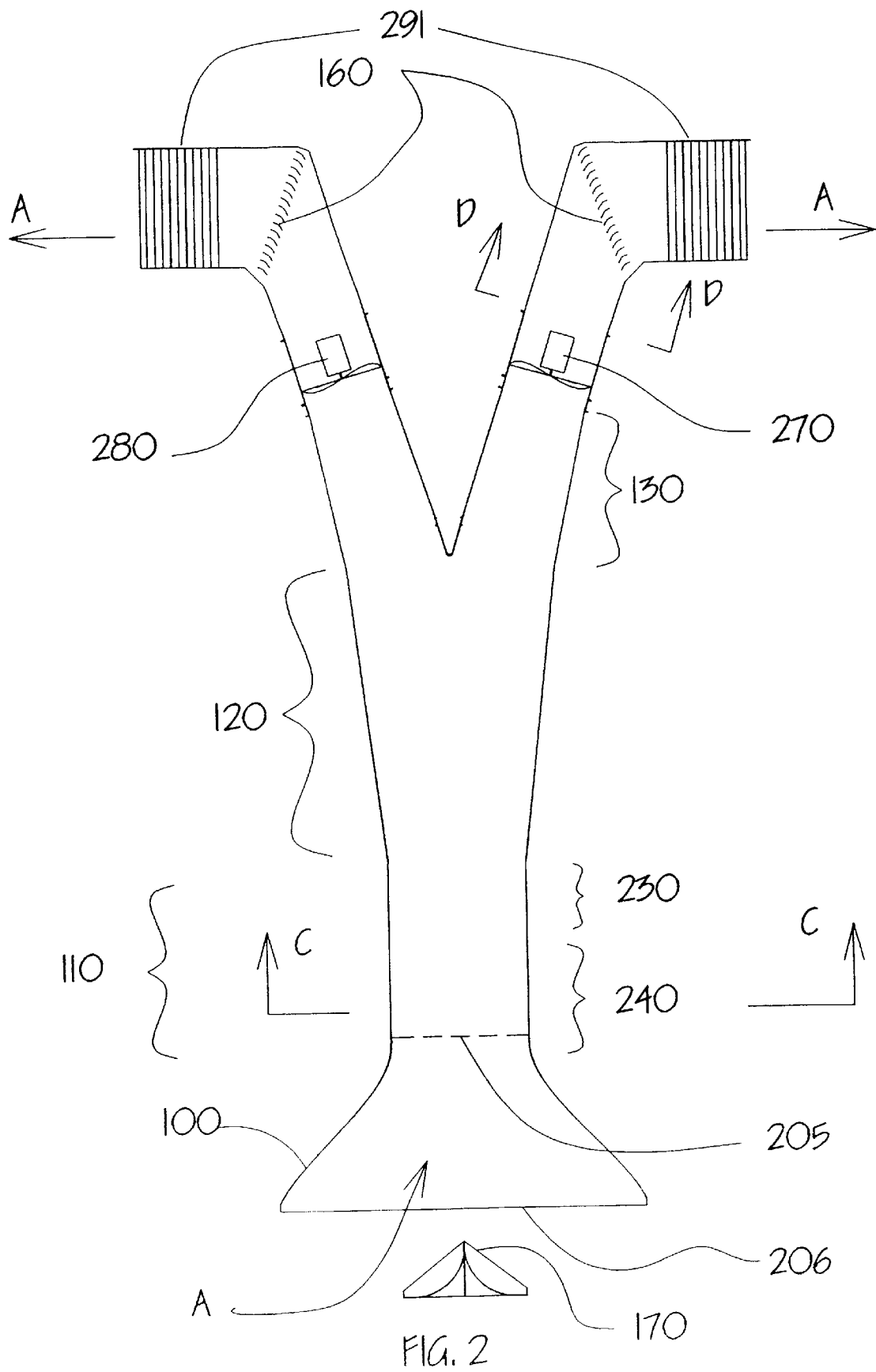
FIG. 2 is a section elevation of FIG. 1 taken along line B—B.

FIG. 2 is a section elevation of FIG. 1 taken at line B—B. Flight chamber 110 has a constant cross-section along its length, so that the airflow velocity across the entire flight chamber is constant. Flight chamber 110 experiences the maximum airflow velocity in the airflow path and, therefore, the greatest aerodynamic stress. Immediately above the flight chamber 110 is the diffuser 120. The sides of the diffuser diverge from the major axis of the invention at approximately 7 degrees. An angle of divergence range of 3 degrees to 7 degrees is acceptable. This results in a smooth transition for the airflow from the flight chamber to the fan inlets. Control of the airflow in this manner results in greater efficiency of the system allowing use of fans with otherwise reduced horsepower. This in turn reduces the overall cost of the invention. In the preferred embodiment, flight chamber 110 is approximately 17 feet tall, although any length flight chamber may be used. Longer flight chambers would require a correspondingly larger fan horsepower due to losses introduced by the additional length of the flight chamber and overall airflow path. A portion of flight chamber 110 comprises a perforated wall section 230. Perforated wall section 230 is located above the staging area 240. The perforated wall section 230 reduces the turbulence that the airflow might otherwise experience as it passes the openings to the staging area as described in FIG. 3. Further, perforated wall section 230 allows a means of reducing buoyancy tendencies, which reduces the tendency of a flyer to otherwise go from the bottom to the top of the flight chamber immediately upon entering the flight chamber. It is known in the art that an obstruction placed in a compressible fluid flow will divert and/or accelerate the fluid as it passes the body. In the instant invention the displaced airflow may exit through the openings in the staging area and re-enter the airflow in the chamber above the user through the perforated wall section 230. This ability to re-route a portion of the airflow increases the stability of the operation of the invention, which in turn enhances the experience of a user. Fans 270 and 280 are mounted above transition section 130. Turning vanes 160 route the airflow into delta diffusers 291. Although this FIG. 2 depicts two fans in cross-section, the preferred embodiment of the invention comprises five fans arranged radially about a major axis of the invention. This FIG. 2 also depicts the vertical wind tunnel without the steel framework identified in FIG. 1 for clarity. Flow straightener 206 connects into the inlet of inlet contraction 100. Flow straightener 206 comprises a honeycomb of various cell heights and sizes that cause the incoming air A, which enters at random angles to the centerline of the invention, to be straightened and therefore more properly align with the centerline of the invention. Tis results in the airflow becoming essentially parallel as it enters the flight chamber 110.

Figure 3:
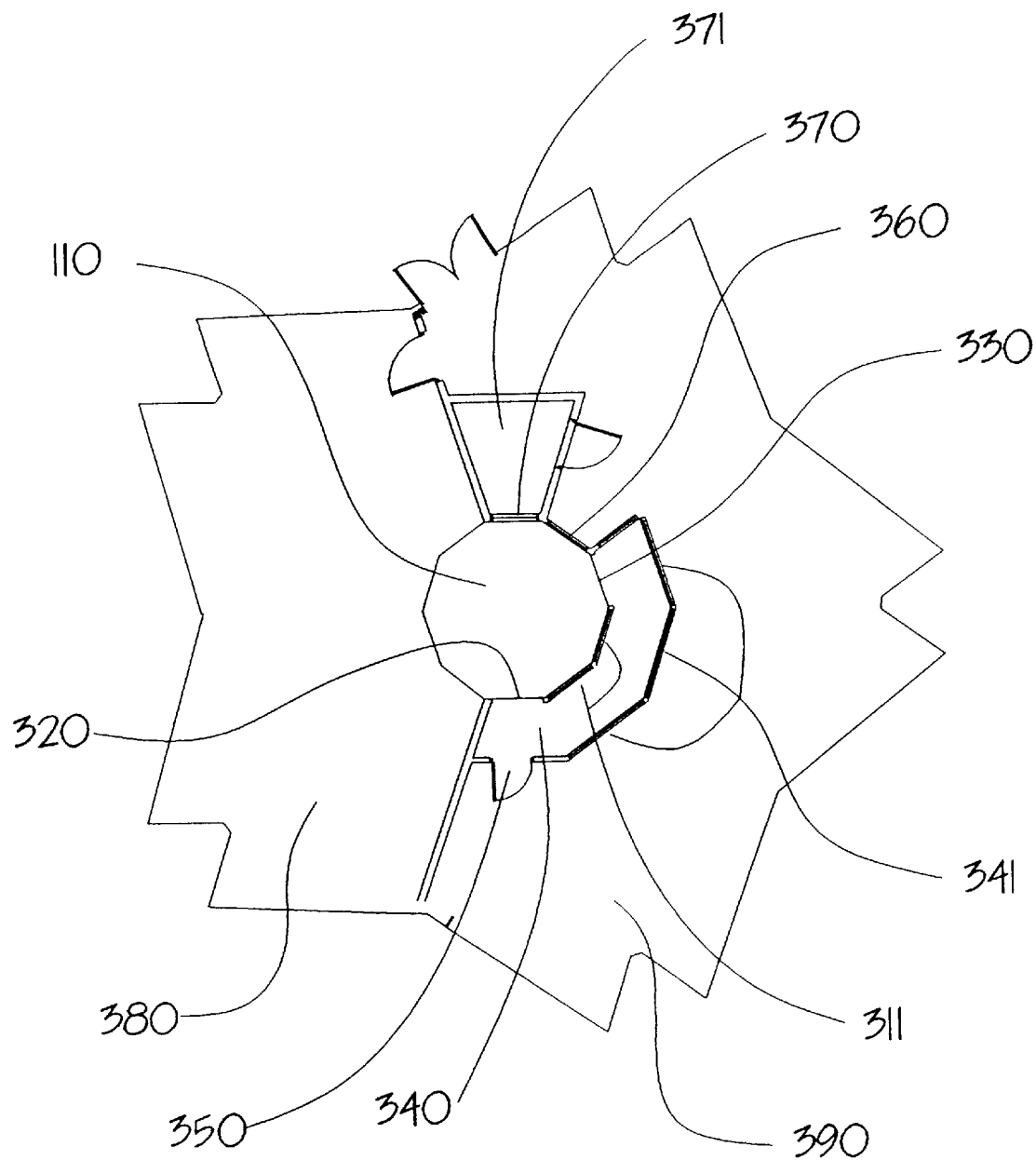
FIG. 3 is a sectional view of FIG. 1 taken along line C—C.

FIG. 3 is a bottom plan view of FIG. 1 through line C—C. Since the vertical wind tunnel arrangement of the invention is symmetrical, flight chamber 110 is located parallel to a major axis of the preferred embodiment. The preferred embodiment of the flight chamber is shown with ten sides, although any number of sides, or round or elliptical sides will suffice. Two of the sides of the flight chamber 110 comprise opening 320 and opening 330 from the staging area by which a user enters and exits the flight chamber 110. Connecting opening 320 and opening 330 is staging area 340. A user enters the staging area 340 through door 350. Another side of flight chamber 110 comprises a window 360 through which an observer may view a user within the flight chamber 310. Another side of the flight chamber 110 comprises a control room 371 having a window 370.

In use, the user first enters a training area where he or she receives instruction in the proper method and technique for skydiving. Once the instruction is completed, the user "suits-up" in a skydiving jumpsuit. The user then proceeds to the observation area with an instructor where he or she is further instructed in the use of the vertical wind tunnel, particularly the flight chamber. The fans are then started at reduced speed or are slowed by the operator in the control room. Door 350 is opened and the user, instructor and any other users, enter the staging area 340, up to six total but more may enter depending upon the size of the staging area. Once all users or students are in the staging area door 350 is closed and the fans are brought up to the proper operating speed by the control room operator. An instructor then enters the flight chamber. A user/student then enters the flight chamber through opening 320 with the assistance of the instructor. The user fly's in the flight chamber 110 with or without the instructor until a given amount of time passes. He or she then exits from the flight chamber through opening 330 to the staging area 340. This process may be repeated in order to meet the needs of the student or user. When the flight session is over, the control room operator throttles back the fans or shuts them off completely. The user then exits from the staging area 340 through door 350.

During operation an operator is in the control room 371. An operator controls the operation of the fans in concert with and in response to the instructions, signals or behavior of a user in the flight chamber 110. Control of the operation of the fans controls the airflow velocity within the flight chamber. Airflow velocity control may be accomplished by varying the rotational speed of the fan motors or by varying the pitch of the fan blades. The remaining sides of the flight chamber 110 comprise a rear screen projector by which scenes from actual skydives may be projected to enhance the illusion of freefall. Reference is made to U.S. Pat. No. 5,655,909, entitled Skydiving Trainer Wind tunnel, which is herein incorporated by reference. Projection equipment (not shown) is contained in projection room 380. Observation room 390 allows non-participating observers to view a user within the flight chamber 110. This is accomplished by viewing through windows 341 in the staging area and windows 311 in the sides of the flight chamber 110. The windows are all large compared to the size of the flight chamber in order to allow a relatively unrestricted view of the flight chamber. The windows comprise Plexiglas®, Lexan® or other high strength transparent material capable of withstanding the differential pressure across the window caused by the operation of the fans. In operation door 350 is dynamically held closed by a force of approximately 40 to 50 lbs./sqft created by the airflow through the flight chamber 110. It is essentially impossible for a user to open door 350 to the staging area 340 while the invention is in operation. This "fail-safe", feature prevents a user from inadvertently entering the staging area while the vertical wind tunnel amusement device is in operation. The arrangement of the openings 320 and 330 minimally affects the airflow within the flight chamber 110. This allows a user to stand in the staging area without experiencing the unpleasant effects of the 120+ mph airflow within the flight chamber. When the user desires to fly within the flight chamber, he or she simply steps through the opening 320 or 330 into the airflow. He or she is immediately supported by the airflow. If adjustment is necessary to stabilize a user, an operator in control room 371 adjusts the operation of the fans (not shown) to increase or decrease the velocity of the airflow. It is the airflow velocity and resulting dynamic pressure on a user which results in a user being fully supported in the flight chamber. Once supported in the airflow, a user may perform all of the maneuvers which a skydiver could otherwise only perform during an actual freefall. The invention allows all of the sensations of skydiving to be experienced by a novice user without the obvious danger of actually jumping out of an aircraft thousands of feet in the air.

Figure 4:
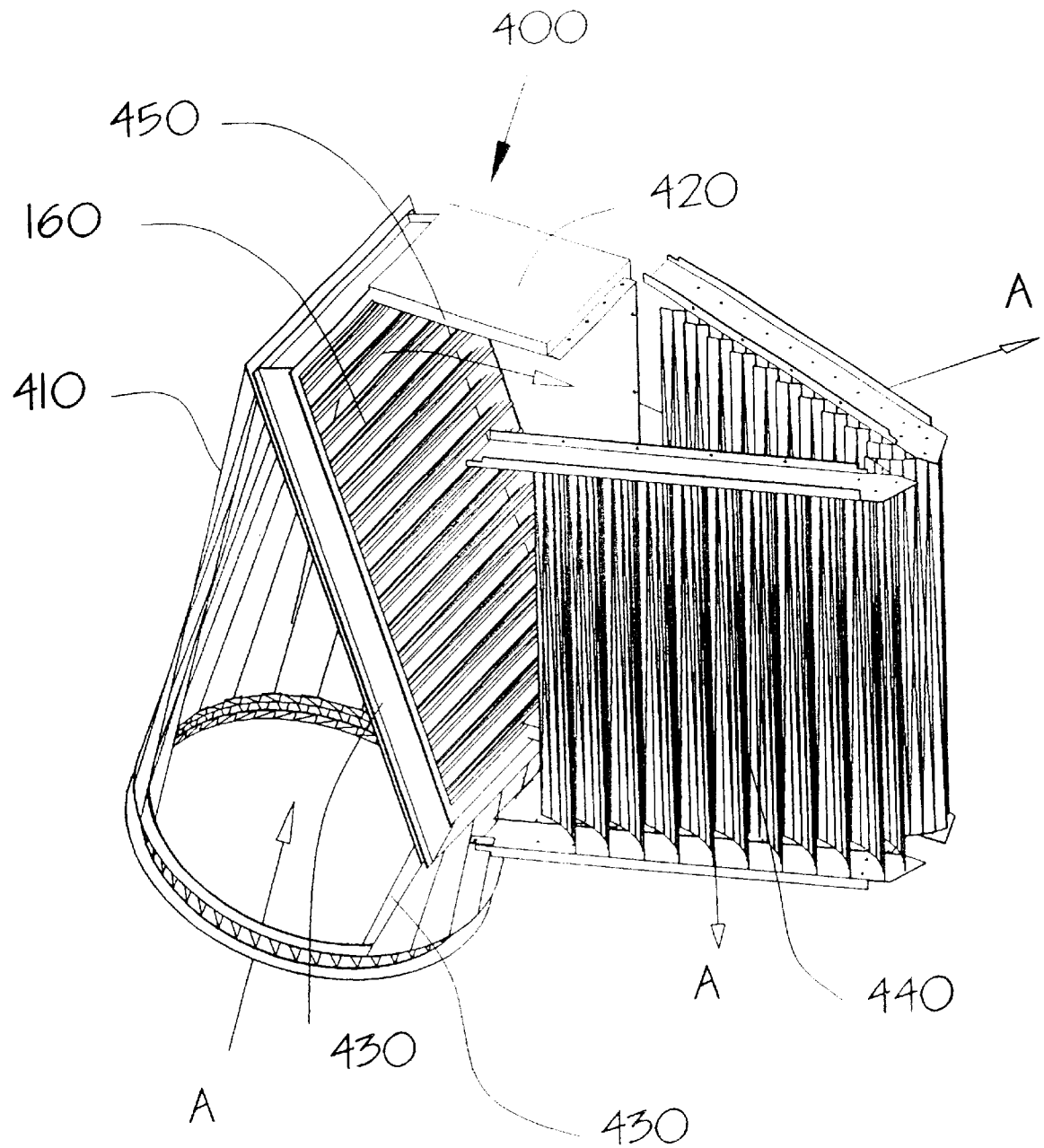
FIG. 4 is a top perspective sectional view of a fan outlet diffuser assembly taken at line D—D in FIG. 2.

FIG. 4 is a perspective view of a fan outlet diffuser assembly 400 cut along line D—D in FIG. 2. A fan outlet duct 410 is connected to each fan as described in FIG. 1. Turning vanes 160 are located between exit duct 420 and outlet duct 410. Airflow A is routed through duct 410 then through turning vanes 160 to then exit from duct 420. Once the airflow A exits duct 420 it enters the delta diffuser 440. The delta diffuser 440 further slows the airflow, thereby reducing the noise. Outlet duct 410 further comprises insulation 430. Exit duct 420 further comprises insulation 450. Insulation 430 and 450 reduce the amount of noise transmitted to the exterior of the invention during operation. The set of such ducts from all fans comprises the radial diffuser assembly as described in FIG. 1, which is an aerodynamically efficient approach to solving a height limitation problem as compared to a much longer, taller conical diffuser. It also prevents rain from directly entering the flight chamber. The airflow in this invention is not returned or recirculated. It is drawn in a single pass through the flight chamber and discharged to atmosphere. This allows invention to be installed with none of the additional costs associated with a return-flow type wind tunnel. These include the return flow duct and supporting structure. The single pass also eliminates the heating of the air that takes place in all return tunnels, thereby increasing user comfort.

Figure 5:
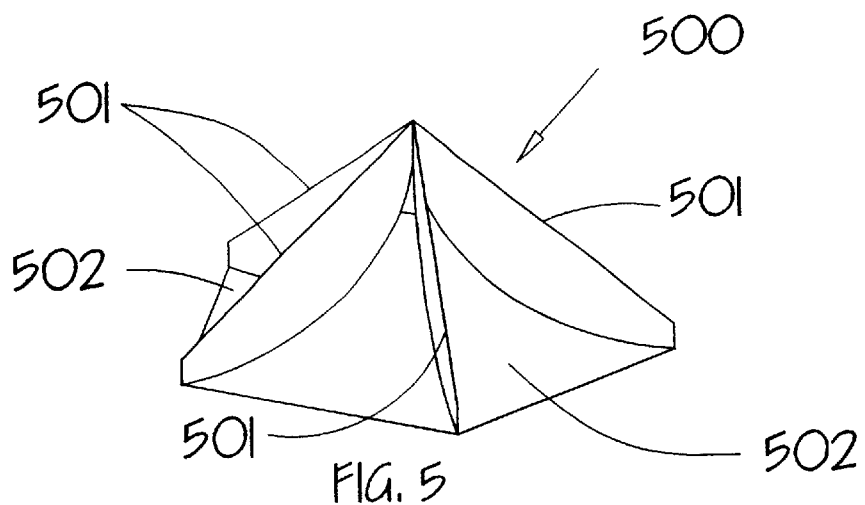
FIG. 5 is a top perspective view of the anti-vortex device.

FIG. 5 is a front perspective view of the anti-vortex device. A plurality of curved surfaces 502 are arranged in a pyramid shaped form. Partitions 501 are located at each seam between the curved surfaces 502. The curved surfaces 502 direct the airflow into the inlet contraction as shown in FIG. 2. Partitions 501 prevent the formation of vortices in the inlet airflow.

Figure 6:
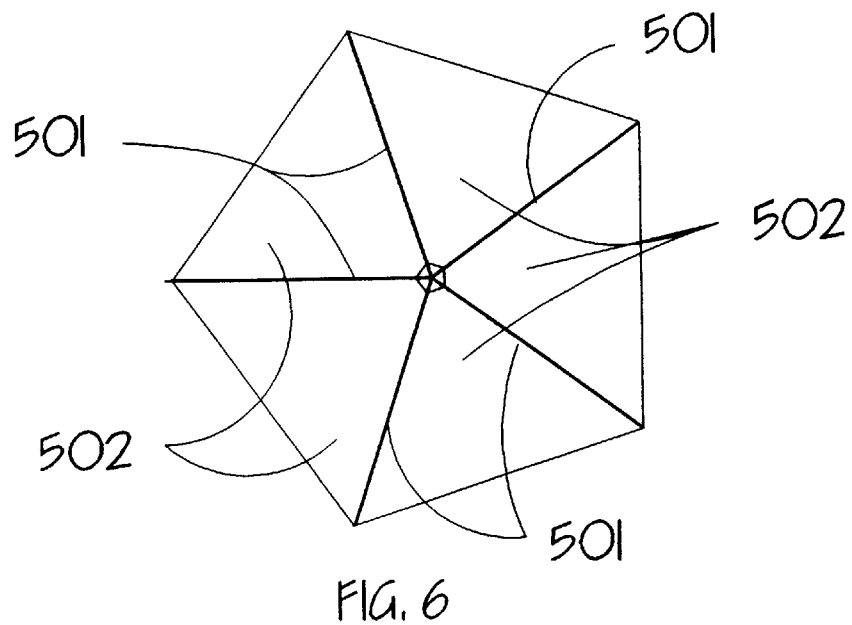
FIG. 6 is a top plan view of the anti-vortex device.

FIG. 6 is a top plan view of the anti-vortex device. The arrangement of the curved surfaces 502 in relation to the partitions 501 is shown.

Figure 7:
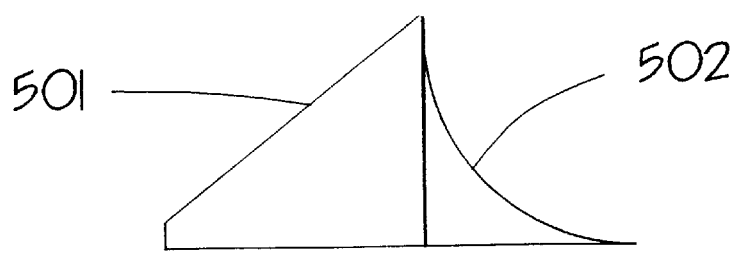
FIG. 7 is a side elevation view of the anti-vortex device.

FIG. 7 is a side elevation view of the anti-vortex device as described in FIGS. 5 and 6.

Figure 8:
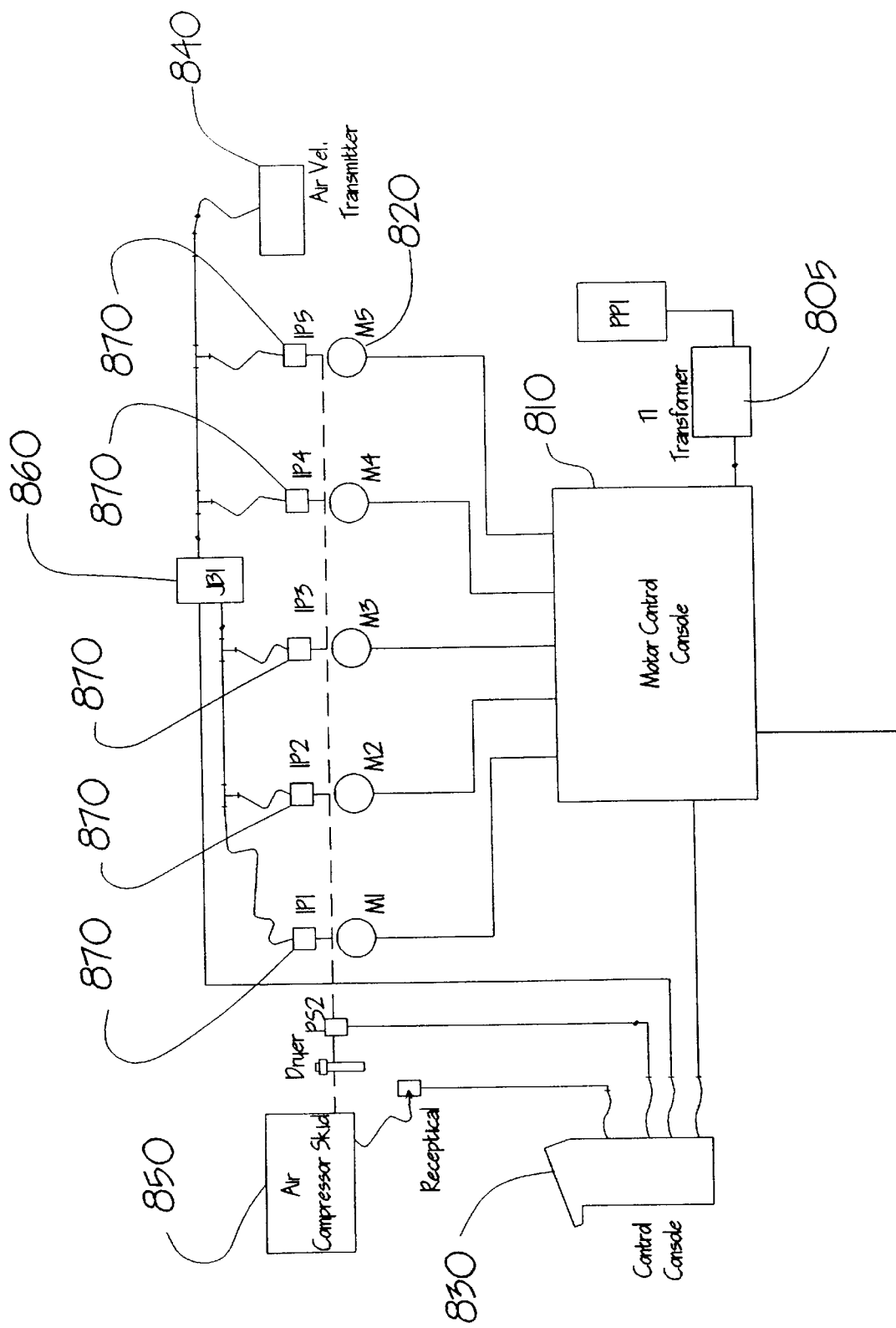
FIG. 8 is a control logic flowchart for the fan pitch.

FIG. 8 is a control logic flowchart for the fan pitch. Motor control center 810 is electrically connected to each fan motor 820. Power is provided to motor control center 810 by transformer 805. Control console 830 is electrically connected to each fan motor 820 and motor control center 810. Control console 830 is located in control room 371 as shown in FIG. 3. Air velocity transmitter 840 sends an electronic signal to the control console 830. The air velocity is displayed on a gage (not shown) on the control console 830. Air velocity transmitter 840 may comprise a hot wire anemometer or pitot tube, each well known in the art. In the preferred embodiment, the fan motors are operated at a constant RPM with airspeed control through the flight chamber achieved by adjusting the pitch of the fan blades. Controller 860 receives a signal from the control console 830 to set the fan blades at a desired pitch. Pneumatic control 870 then adjusts the fan blade pitch with compressed air applied to a fan pitch adjustment device on each fan, know in the art. Pneumatic control 870 receives air from air compressor 850.

Figure 9:
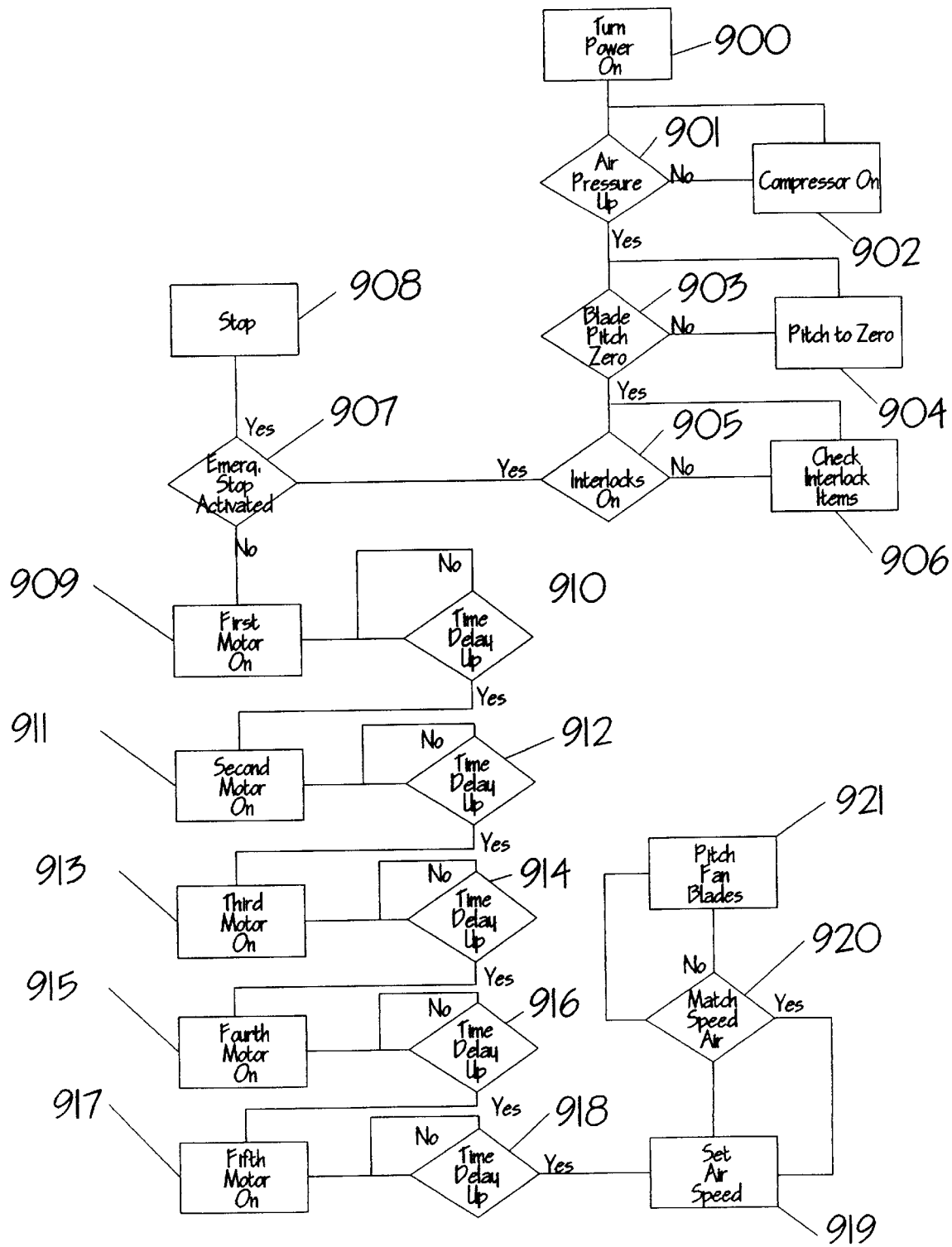
FIG. 9 is a flowchart depicting the control scheme for the invention.

FIG. 9 is a flowchart depicting the control scheme for the invention. In order to operate the invention, the power is first turned on to the system 900. Next, the air pressure for the control system is checked 901 and if found to be too low, the air compressor is operated 902. The fan pitch is checked for being set to zero 903. If found not to be at zero, it is then set to zero 904. The interlocks are then tested 905. The interlocks include signals relating to fan vibration, control system failure, loss of compressed air, loss of system power, loss of fan power. If the interlocks are not proper, then they are checked 906. If the interlocks are proper, then the emergency stop is activated 907. If no system stop command is sent, then the first fan motor is started 909. A time delay is then enabled to prevent simultaneous fan starts 910. This minimizes high current conditions on the electrical system. Once the time delay is satisfied, the second motor is started 911. Again, once the time delay is satisfied 912, then the third fan is started 913. Once the time delay is satisfied 914, the fourth fan is started 915. Once the time delay is satisfied 916, the fifth fan is started 917. Once the time delay is satisfied 918, then the air speed is set 919. This may be done automatically or by an operator. A feedback loop is then used to compare the air speed 920 to the fan blade pitch 921. Once the match is properly achieved, the invention is in operation and ready for use. The operator then adjusts the fan pitch to accommodate the users in the flight chamber. The invention is shut down by simply by turning off each fan in series or simultaneously.

Figure 10:
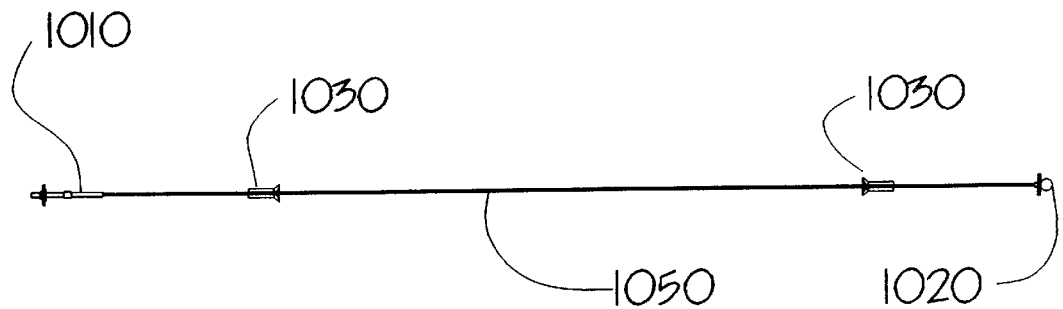
FIG. 10 is a side elevation view of a floor mesh cable.

FIG. 10 is a side plan view of a floor mesh cable. Cable 1050 has threaded rod fitting 1010 at one end. At the other end is ball end fitting 1020. Sleeves 1030 guide cable 1050 at each end where cable 1050 is installed through the structural members as shown in FIG. 11.

Figure 11:
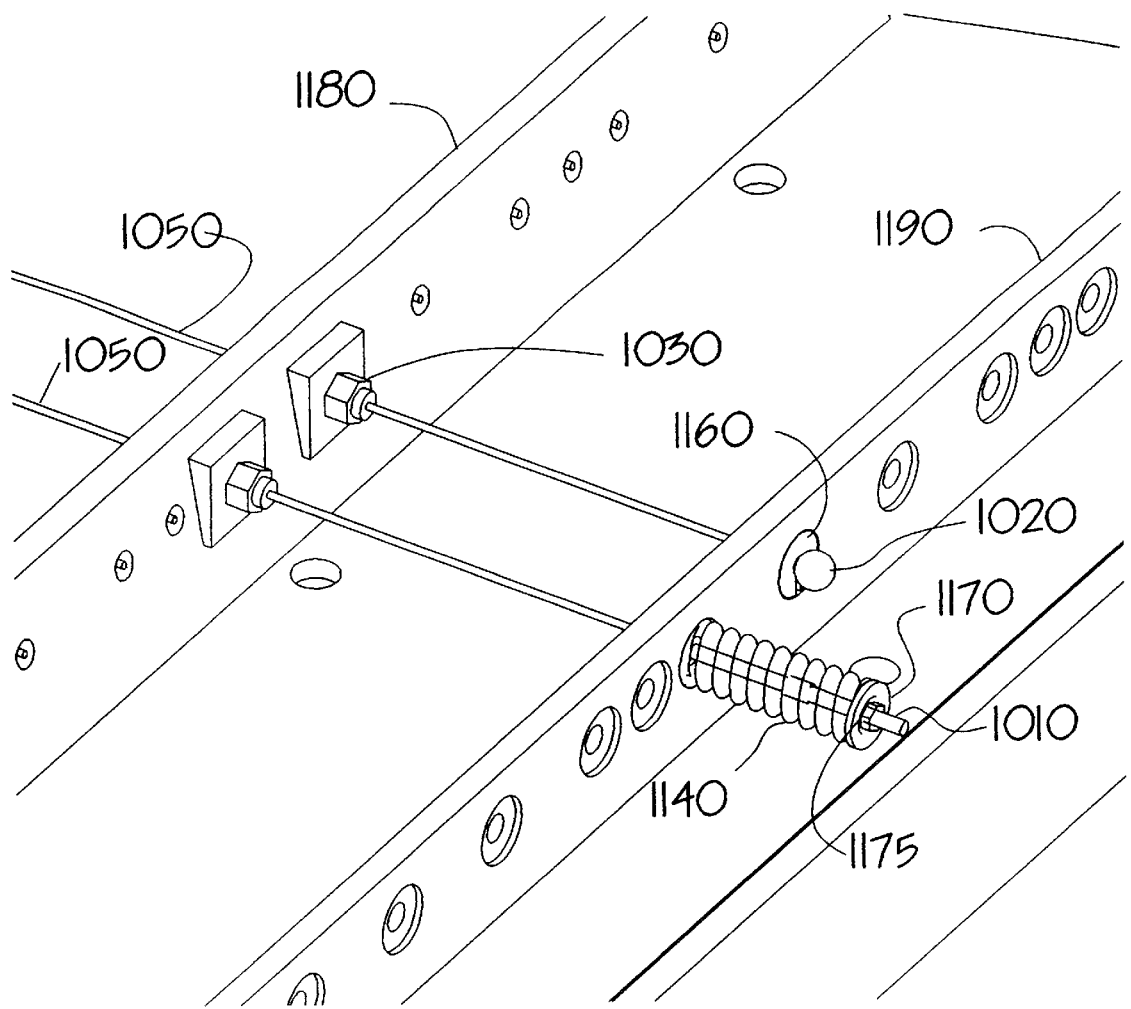
FIG. 11 is a top perspective view of the floor mesh suspension system.

FIG. 11 is a perspective view of the floor mesh suspension system. Cable 1050 is a length of galvanized cable having a diameter in the range of 1/8" to 3/32". At one end of cable 1050 is ball end fitting 1020. Ball end fitting 1020 is permanently attached to the end of cable 1050. At the other end of cable 1050 is threaded rod fitting 1010. The cables are installed in such a manner so that each end alternates with the other. The cables span the entire width of the flight chamber at its base, just above the inlet bell. The cables are on approximately 2" centers and form a standard crossed pattern. Each end of the cable spans between structural members 1180 and 1190. Structural member 1180 contains sleeves 1030 which guide the cable as it stretched by a user. Cables 1050 are anchored into structural member 1190. Spring 1140 is captured between structural member 1190 and retainer 1170 with nut 1175. Spring 1140 is preloaded in an amount so the overall effect is to allow a user or users to comfortably stand on the floor mesh without significantly deflecting it. In use, floor mesh 1050 is trod upon or impacted by a user. The force of the user deflects the floor mesh in an amount related to the preload tension from spring 1140. This allows the floor mesh to have "give", which allows a user to fall on the floor mesh with decreased chance of injury. The wide spacing of the floor mesh allows the airflow through the flight chamber with minimal frictional loses. The component construction of the floor mesh with individual cables allows the operator to replace individual cables as necessary without the need to replace the entire floor mesh once it begins to wear through use.

Figure 12:
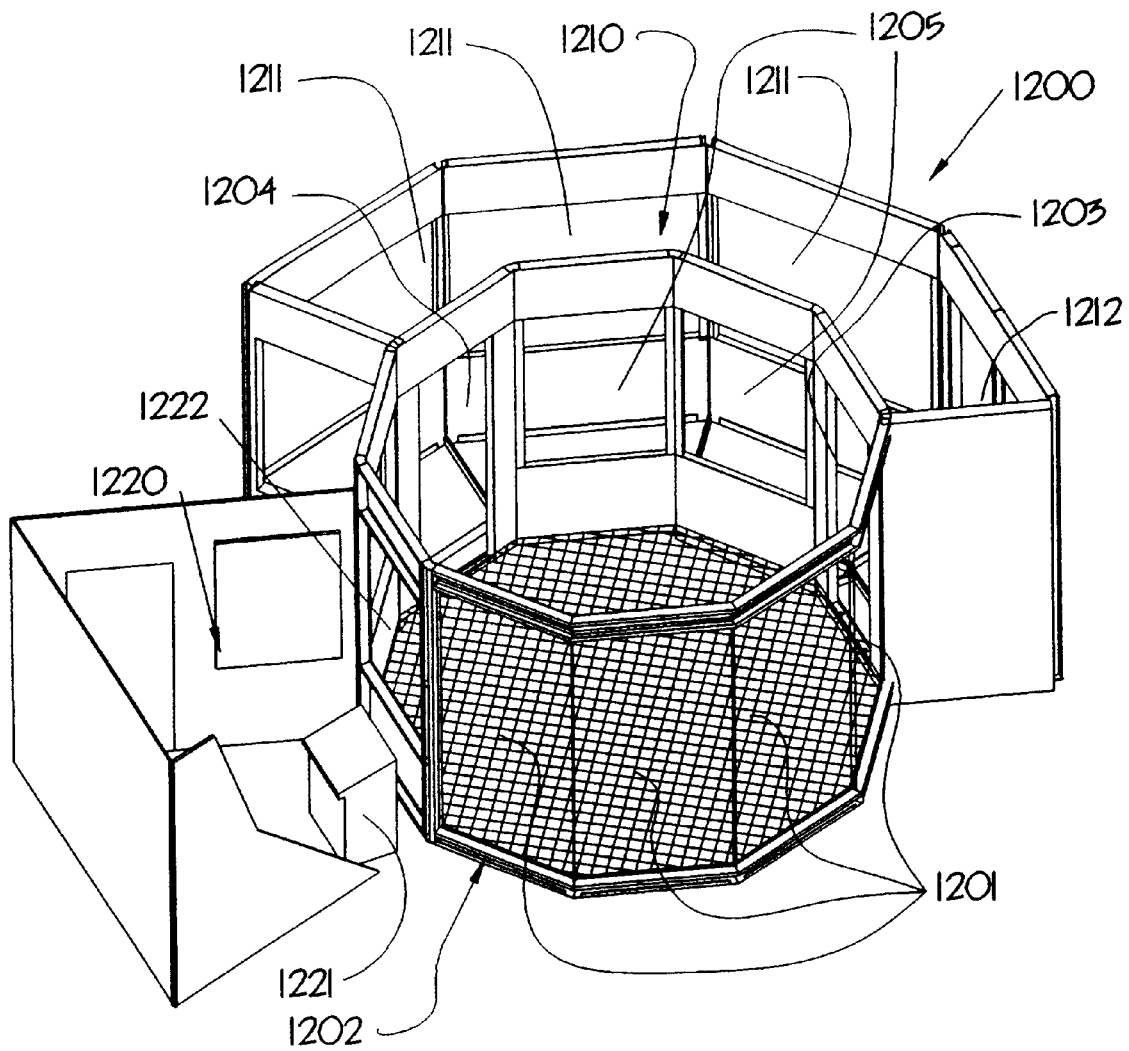
FIG. 12 is a perspective cross-section view of the flight chamber.

FIG. 12 is a perspective cross-section view of the flight chamber. A plan view of the flight chamber is shown in FIG. 3. As more fully described in this specification and the accompanying figures, flight chamber 1200 comprises windows 1201 and windows 1205. Windows 1201 may be used for viewing out of the flight chamber 1200 or used to allow a user to view scenes projected upon a screen in the projection room as described in FIG. 3. A user enters the flight chamber 1200 through openings 1203 or 1204. Staging area 1210 is adjacent to flight chamber 1200. A user enters the staging area 1210 through door 1212. Windows 1205 allow person(s) in the staging area to view the flight chamber 1200. Staging area 1210 further comprises windows 1211 which allow person(s) to view the staging area 1210 as well as the flight chamber 1200. Floor mesh 1202 supports a user during operation of the invention in the event the airflow in insufficient to fully support the user, such as during fan start-up or shut-down as described in FIGS. 8 and 9. Control room 1220 is adjacent to flight chamber 1200. Window 1222 allows a control operator to view the flight chamber 1200. Control panel 1221 is also contained within control room 1220.

Figure 13:
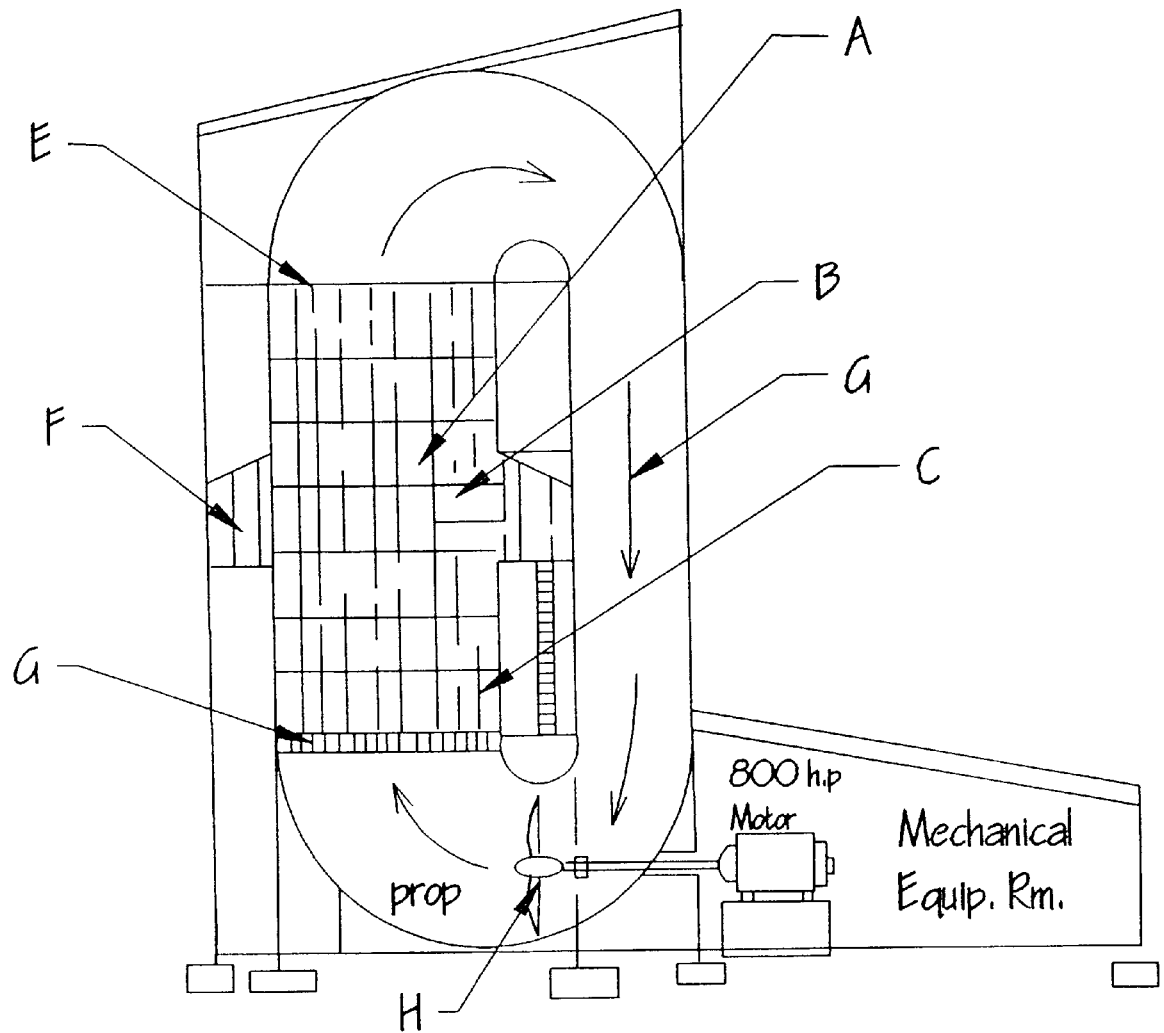
FIG. 13 depicts a prior art vertical wind tunnel.

FIG. 13 depicts a prior art vertical wind tunnel. Shown is the simulation chamber A, the control room B, flow straightener D and safety net E. Access to the simulation chamber is gained through access door C. Observation area F is adjacent to the simulation chamber A, without the benefit of walls. This prior art wind tunnel includes return air flow by way of duct G. A single fan H is also depicted. Simulation chamber A is shown on the discharge side of fan H.

Figure 14:
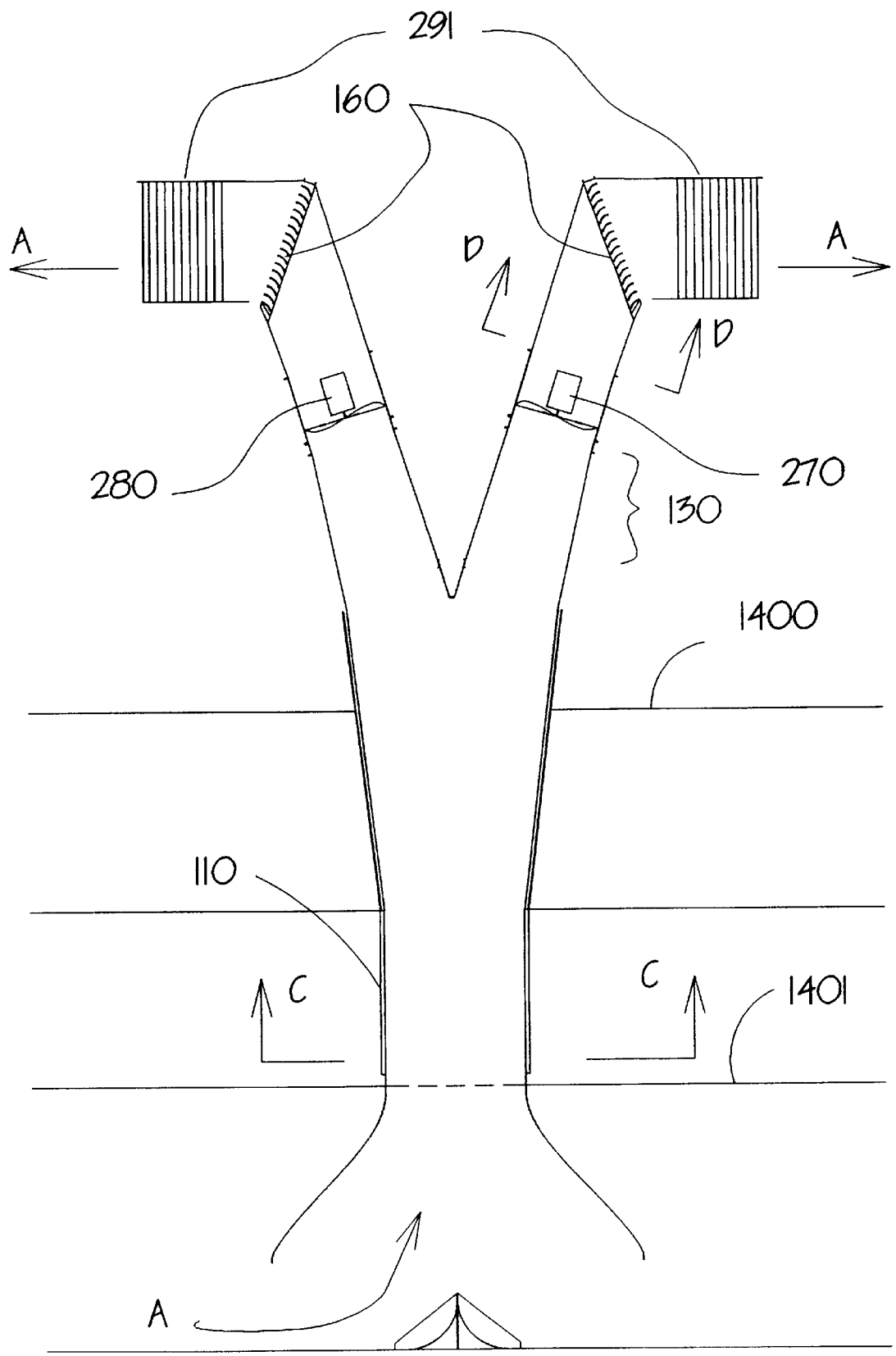
FIG. 14 is a cross-sectional view of an alternate embodiment.

FIG. 14 is a cross-sectional view of alternate embodiment. The overall arrangement of the vertical wind tunnel is as described in FIG. 2. The invention is installed in a mall or other public building. The flight chamber 110 is situated on a main level 1401 where the public can view persons within. The upper portions of the wind tunnel extend above the roof 1400 of a building. The inlet contraction 100 extends below the floor of the main level 1401.

Figure 15:
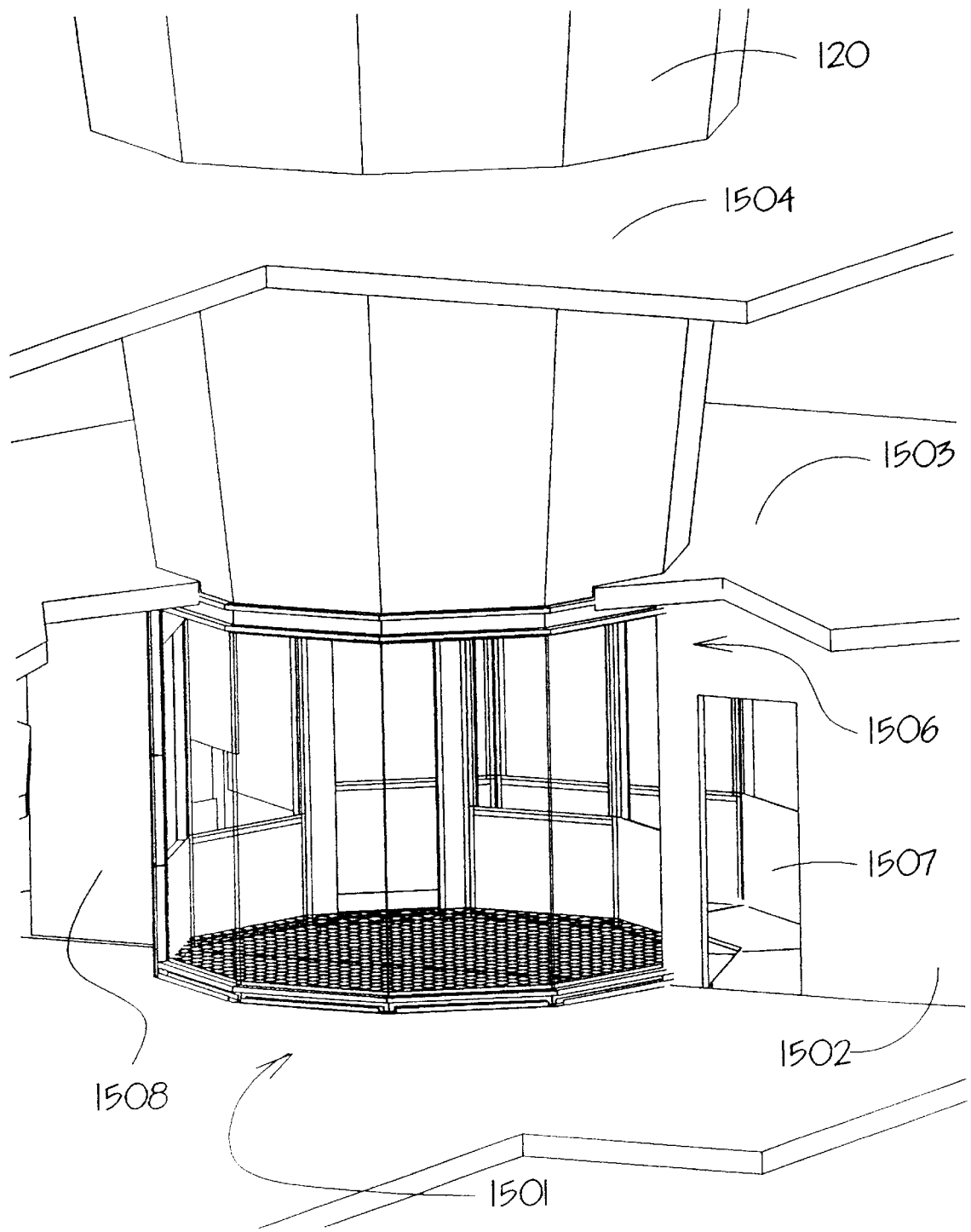
FIG. 15 is a top perspective view of an alternate embodiment.

FIG. 15 is a top perspective view of an alternate embodiment. Flight chamber 110 is shown between the floor of the main level 1501 and the ceiling of the main level 1503. The diffuser assembly 120 extends above the roof 1504 of the building. A wall or partition 1502 separates the public area 1501 from the staging area 1507.

Figure 16:
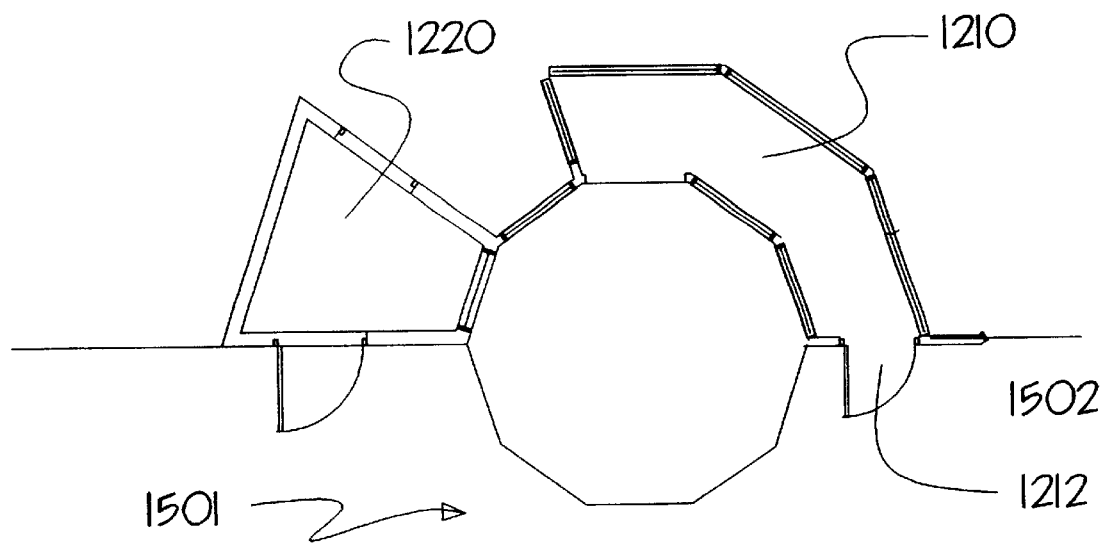
FIG. 16 is a top plan view of an alternate embodiment at line C—C in FIG. 14.

FIG. 16 is a top plan view of an alternate embodiment at line C—C in FIG. 14. The public area 1501 is shown with the control room 1220 and the staging area 1210 behind the wall 1502. The public views the flight chamber through windows 1211.

Figure 17:
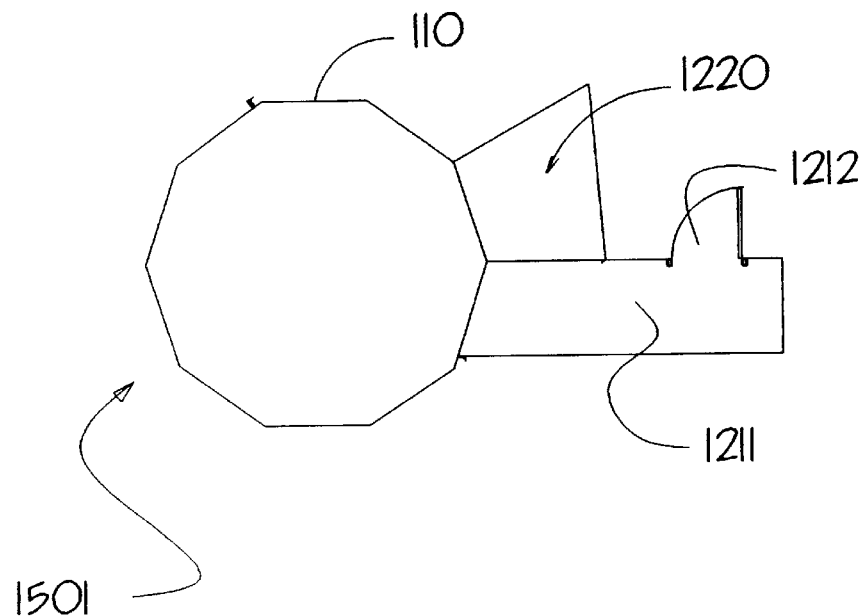
FIG. 17 is a top plan view of an alternate embodiment at line C—C in FIG. 14.

FIG. 17 is a top plan view of an alternate embodiment at line C—C in FIG. 14. It is not necessary for staging area 1211 to "wrap around" the flight chamber 110. The staging area 1211 may have a single access door 1701 to the flight chamber. The staging area 1211 extends radially away from the flight chamber. Control room 1220 is adjacent to the staging area. As shown the control room 1220 may be located in any area adjacent to the flight chamber or may be remote with video links to the flight chamber by which a control operator may view the activities in the flight chamber.

Figure 18:
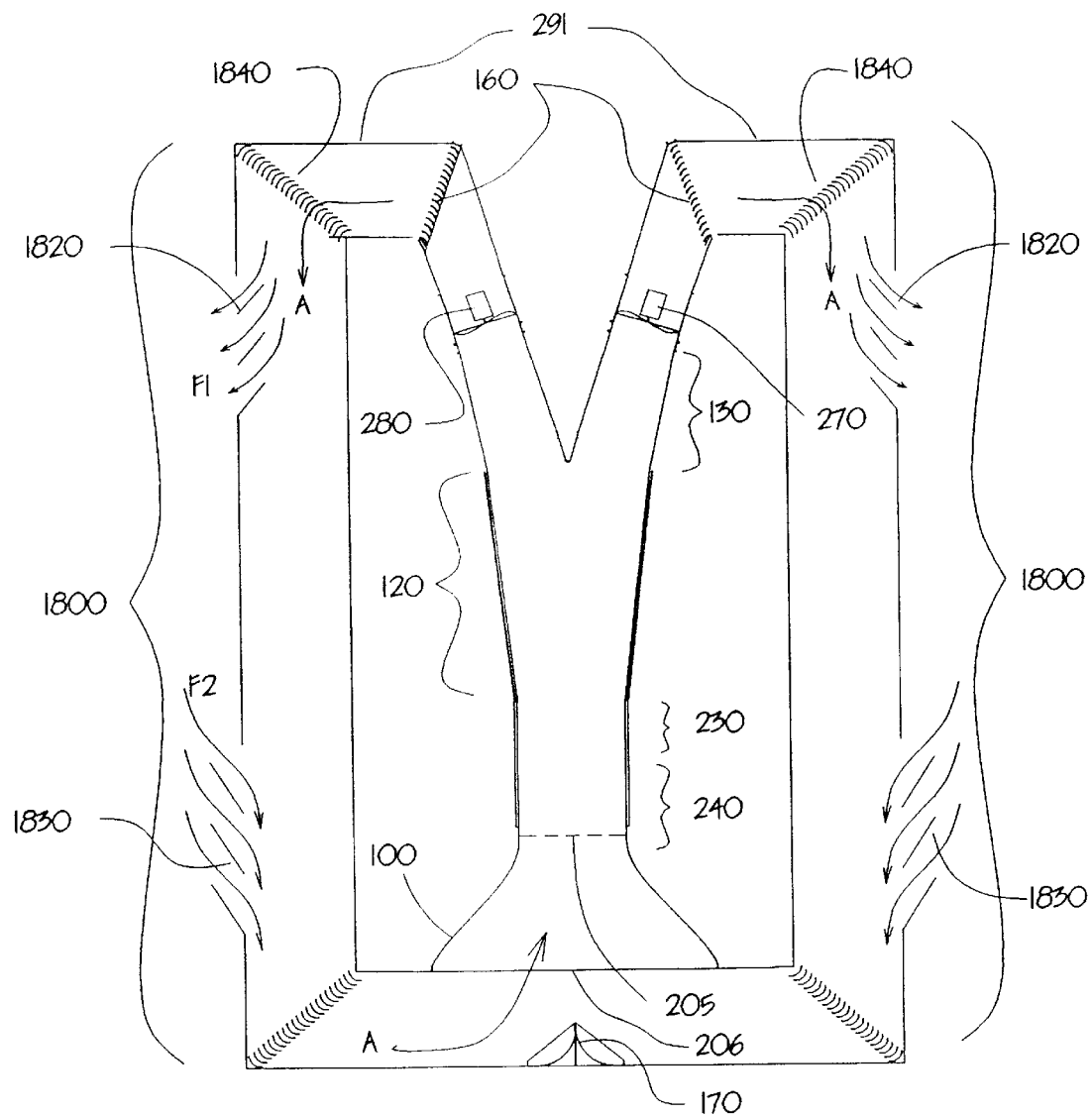
FIG. 18 is a cross-sectional view of a recirculating airflow embodiment through A—A of FIG. 19.

FIG. 18 is a cross-sectional view of a re-circulating airflow embodiment 1899. Return air duct 1800 is connected at a top end to exit duct 420, with delta diffusers 291 removed. The lower end of return air duct 1800 is connected to plenum 1810. A plurality of return air ducts 1800, 1801, 1802, 1803, 1804 are used, each substantially identical to each of the others. Five are used in the preferred embodiment of this alternate embodiment. Plenum 1810 is connected to inlet contraction 100. Airflow A is routed from fan exit duct 420, through return air duct 1800 into inlet plenum 1810. Airflow A then re-enters the vertical wind tunnel through inlet contraction 100.

Each return air duct 1800 further comprises outlet damper 1820 and inlet damper 1830. Outlet damper 1820 and inlet damper 1830 are used in concert to adjust the temperature of the airflow. It is known in the art that a rise in the temperature of the airflow will occur by the use of recirculated air in the wind tunnel. To avoid this problem, outlet dampers 1820 and inlet dampers 1830 are used to exchange a portion of the airflow at a higher temperature, with ambient air at a lower temperature. Each is adjustable in order to allow a user to 'fine-tune' the temperature of the airflow. Generally, each pair of dampers is adjusted and balanced with the other so that the air mass blown from the return air duct 1800 through outlet damper 1820 is replaced by the same mass of air entering through the inlet damper 1830. This improves flyer comfort by lowering the overall temperature of the airflow. A temperature sensor, not shown, is used by an operator to detect the temperature of the airflow. The operator then adjusts the dampers in response to the outside temperature, which is detected by a temperature sensor, not shown. Flow straightener 206 is shown at the opening to inlet contraction 100.

Figure 19:
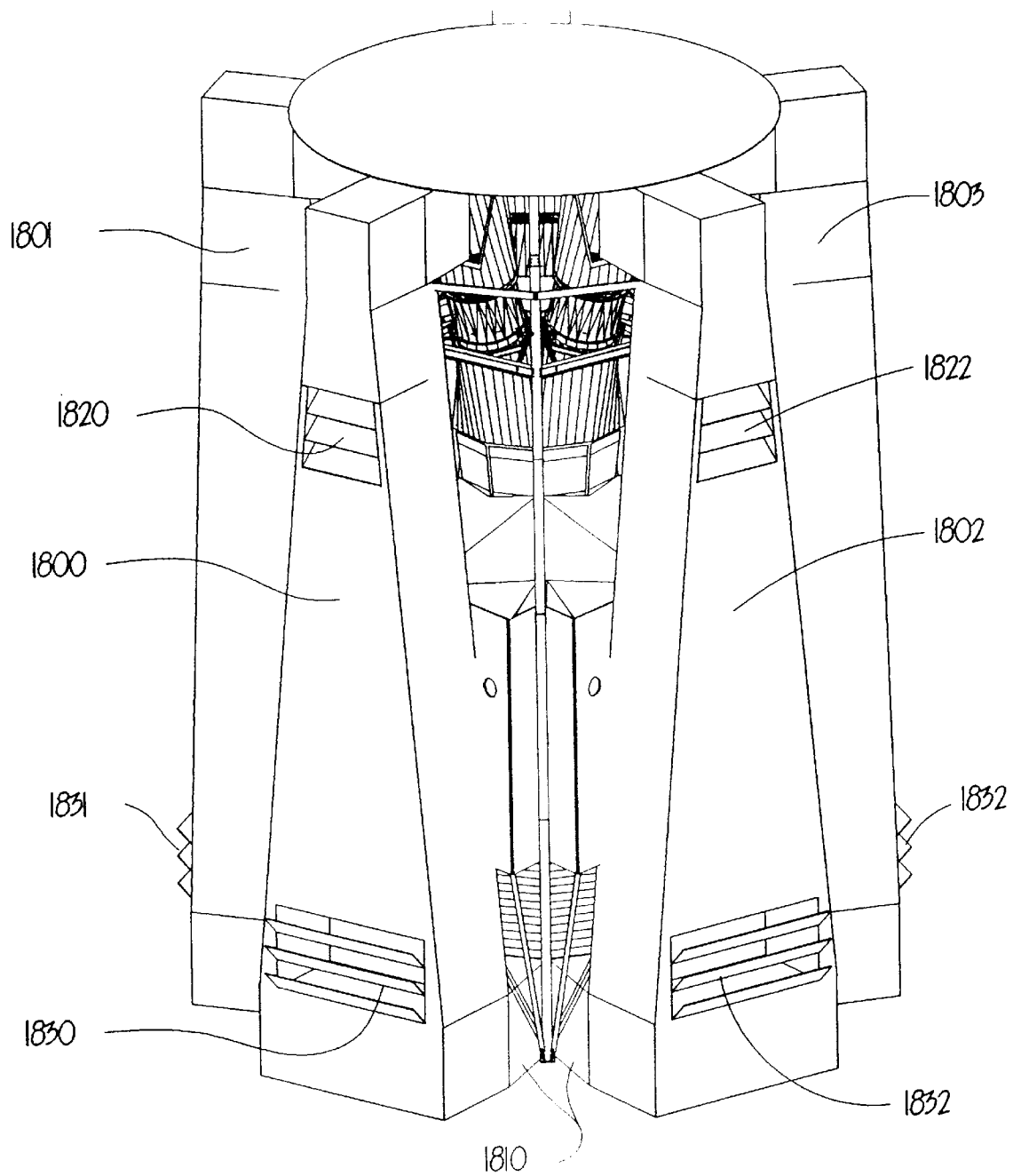
FIG. 19 is a top perspective view of a recirculating airflow embodiment.

FIG. 19 is a top perspective view of a re-circulating airflow embodiment. Return air ducts 1800, 1801, 1802, 1803, and 1804 are shown arranged around an outer perimeter of the vertical wind tunnel. Return air ducts 1800 and 1820 each have outlet damper 1820 and 1822, respectively. Each also has inlet damper 1830 and 1832, respectively. The inlet damper and outlet damper positions can be set and adjusted by manual mechanisms or by an automatic controller sensing the temperature of the airflow.

Each return air duct 1800 has a cross-sectional area that gradually expands from the fans toward plenum 1810 with an angle γ from a centerline. This has the effect of gradually increasing the cross-sectional area of the return air duct. Angle γ, in the range of 1° to 5°, is chosen so that air turbulence and flow separation in the return air duct are minimized, thereby reducing total pressure loss, and thereby power requirements during operation.

Figure 20:
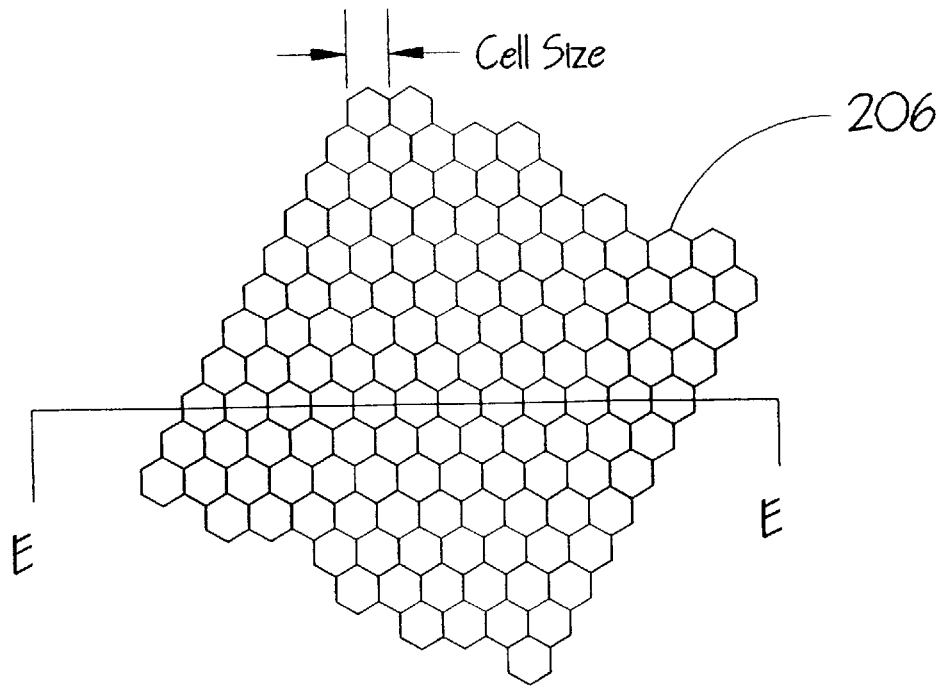
FIG. 20 is a plan view of the flow straightener.

FIG. 20 is a plan view of a flow straightener. Flow straightener 206 comprises adjacent cells having a geometric, symmetric or asymetric shape.

Figure 21:
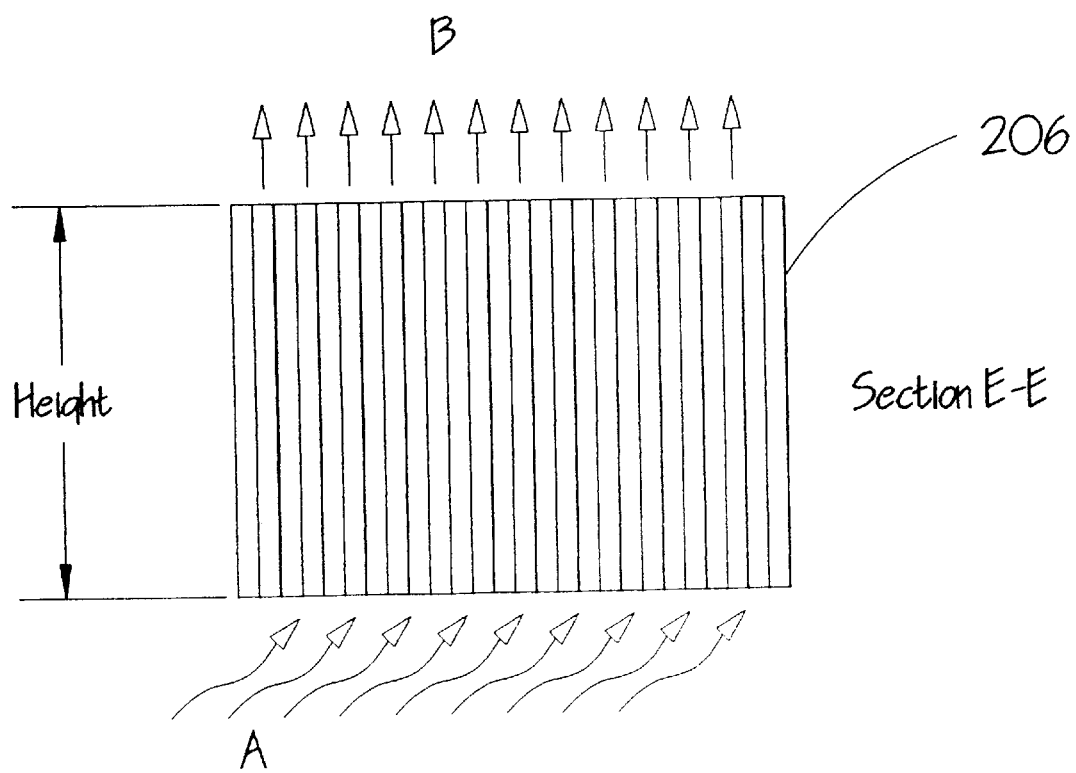
FIG. 21 is a side elevation view of the flow straightener through E—E of FIG. 20.

FIG. 21 is a side elevation view of a flow straightener through line E—E of FIG. 20. Air flows from A through the flow straightener to B. The flow straightener has height H.

Although the present invention has been described with reference to preferred embodiments, numerous modifications and variations can be made and still the result will come within the scope of the invention. No limitation with respect to the specific embodiments disclosed herein is intended or should be inferred.

We claim:

1. A vertical wind tunnel amusement device comprising:
   a chamber for containing an airflow;
   a fan whereby an airflow is induced in said chamber;
   said fan communicating with said chamber by a duct; and
   a staging area forming an outer chamber adjacent to said chamber;
   an opening aerodynamically communicating with said chamber; and
   an upper section comprising perforations above said opening and between said staging area and said chamber whereby said staging area further aerodynamically communicates with said chamber.

2. The vertical wind tunnel amusement device as in claim 1, wherein said duct has a diverging taper from said chamber to said fan thereby reducing an airflow velocity to a level incapable of supporting a user.

3. The vertical wind tunnel amusement device as in claim 2 further comprising an inlet contraction connected to said chamber at a bottom end opposite said fan.

4. The vertical wind tunnel amusement device as in claim 3 further comprising a plurality of fans mounted on top of the chamber for inducing an airflow upwards through the chamber.

5. The vertical wind tunnel amusement device as in claim 4 further comprising:
   a return air duct having a first end connected to an outlet of said fan;
   a plenum aerodynamically communicating with said inlet contraction; and
   a second end of said return air duct connected to said plenum.

6. The vertical wind tunnel amusement device as in claim 5, wherein said return air duct further comprises:
   an inlet damper in said second end; and
   an outlet damper in said first end.

7. The vertical wind tunnel amusement device as in claim 6, wherein said return air duct further comprises:
   a cross-sectional area which gradually increases from said first end to said second end.

8. The vertical wind tunnel amusement device as in claim 7 further comprising a plurality of return air ducts, each aerodynamically communicating with a fan and said plenum.

9. The vertical wind tunnel amusement device as in claim 7 further comprising:

a temperature sensor for detecting a temperature of an airflow in said chamber;

a temperature sensor for detecting a temperature external to said chamber; and a display for presenting each of said temperatures to a user.

10. The vertical wind tunnel amusement device as in claim 9 further comprising a flow straightener cooperating with said inlet contraction.

11. The vertical wind tunnel amusement device as in claim 3 further comprising an anti-vortex device aerodynamically cooperating with said inlet contraction.

12. A vertical wind tunnel amusement device comprising:

a chamber for containing an airflow;

a fan whereby an airflow is induced in said chamber;

said fan communicating with said chamber by a duct;

a staging area forming an outer chamber adjacent to said chamber, said staging area aerodynamically communicating with said chamber;

wherein said chamber further comprises a floor mesh, said floor mesh comprising:

a plurality of cables, each having a fitting at one end and an adjustable fitting at the other end;

each of said cables strung between structural members in a mesh fashion with each fitting in an opposing structural member;

a spring about said adjustable fitting on each cable, said spring contained between a fastener and a structural member whereby each of said cables is preloaded; and said floor mesh located at a lower end of said chamber.

13. The vertical wind tunnel amusement device as in claim 12, wherein said chamber further comprises windows.

14. The vertical wind tunnel amusement device as in claim 13, wherein said staging area further comprises windows for viewing said chamber.

15. The vertical wind tunnel amusement device as in claim 14, wherein said staging area further comprises windows whereby an observer may view said staging area and said chamber.

16. The vertical wind tunnel amusement device as in claim 15 further comprising a control room adjacent to said chamber.

17. A vertical wind tunnel amusement device comprising:

a chamber for containing an airflow;

a fan whereby an airflow is induced in said chamber;

said fan communicating with said chamber by a duct;

a staging area forming an outer chamber adjacent to said chamber, said staging area aerodynamically communicating with said chamber; and a projection room adjacent to said chamber whereby scenes are projected on a chamber outside surface for viewing by a user and a diffuser connected to a discharge of said fan thereby reducing exit noise.

18. A vertical wind tunnel amusement device comprising:

a chamber for containing an airflow;

a fan whereby an airflow is induced in said chamber;

said fan communicating with said chamber by a duct; and a staging area forming an outer chamber adjacent to said chamber;

an opening aerodynamically communicating with said chamber; and wherein said duct has a diverging taper from said chamber to said fan thereby reducing an airflow velocity to a level incapable of supporting a user.

19. A vertical wind tunnel amusement device comprising:

a chamber for containing an airflow;

a fan whereby an airflow is induced in said chamber;

said fan communicating with said chamber by a duct; and a staging area forming an outer chamber adjacent to said chamber;

an opening aerodynamically communicating with said chamber; and an inlet contraction connected to said chamber at a bottom end opposite said fan.

20. A vertical wind tunnel amusement device comprising:

a chamber for containing an airflow;

a fan whereby an airflow is induced in said chamber;

said fan communicating with said chamber by a duct; and a staging area forming an outer chamber adjacent to said chamber;

an opening aerodynamically communicating with said chamber; and a plurality of fans mounted on top of the chamber for inducing an airflow upwards through the chamber.

21. A vertical wind tunnel amusement device comprising:

a chamber for containing an airflow;

a fan whereby an airflow is induced in said chamber;

said fan communicating with said chamber by a duct;

a staging area forming an outer chamber adjacent to said chamber, said staging area aerodynamically communicating with said chamber;

said chamber further comprises a floor mesh, said floor mesh comprising:

a plurality of cables, each having a fitting at one end and an adjustable fitting at the other end;

each of said cables strung between structural members in a mesh fashion with each fitting in an opposing structural member;

a spring about said adjustable fitting on each cable, said spring contained between a fastener and a structural member whereby each of said cables is preloaded; and said floor mesh located at a lower end of said chamber.

22. The vertical wind tunnel amusement device as in claim 21 further comprising a diffuser connected to a discharge of said fan thereby reducing exit noise.

23. The vertical wind tunnel amusement device as in claim 22 further comprising an anti-vortex device aerodynamically cooperating with said inlet contraction.

24. A vertical wind tunnel amusement device comprising:

a chamber for containing an airflow;

a fan whereby an airflow is induced in said chamber;

said fan communicating with said chamber by a duct; and a staging area forming an outer chamber adjacent to said chamber;

an opening aerodynamically communicating with said chamber; and said chamber further comprises windows.

25. The vertical wind tunnel amusement device as in claim 24, wherein said staging area further comprises windows for viewing said chamber.

26. The vertical wind tunnel amusement device as in claim 25, wherein said staging area further comprises windows whereby an observer may view said staging area and said chamber.

27. A vertical wind tunnel amusement device comprising:

a chamber for containing an airflow;

a fan whereby an airflow is induced in said chamber;

said fan communicating with said chamber by a duct;

a staging area forming an outer chamber adjacent to said chamber, said staging area aerodynamically communicating with said chamber; and a flow straightener cooperating with an inlet contraction.

28. A vertical wind tunnel amusement device comprising:

a chamber for containing an airflow;

a fan whereby an airflow is induced in said chamber;

said fan communicating with said chamber by a duct;

a staging area forming an outer chamber adjacent to said chamber, said staging area aerodynamically communicating with said chamber;

a return air duct having a first end connected to an outlet of said fan;

a plenum aerodynamically communicating with said chamber; and a second end of said return air duct connected to said plenum.

29. The vertical wind tunnel amusement device as in claim 28 wherein said staging area further comprises;

an opening aerodynamically communicating with said chamber.

30. The vertical wind tunnel amusement device as in claim 29 further comprising an inlet contraction connected to said chamber at a bottom end opposite said fan and said plenum.

31. The vertical wind tunnel amusement device as in claim 30 further comprising a plurality of fans mounted on top of the chamber for inducing an airflow through the chamber.

32. The vertical wind tunnel amusement device as in claim 31 further comprising;

an upper section comprising perforations above said opening and between said staging area and said chamber whereby said staging area further aerodynamically communicates with said chamber.

33. The vertical wind tunnel amusement device as in claim 32 further comprising an anti-vortex device aerodynamically cooperating with said inlet contraction.

34. The vertical wind tunnel amusement device as in claim 33 further comprising a flow straightener cooperating with said inlet contraction.

35. The vertical wind tunnel amusement device as in claim 34, wherein said return air duct further comprises:

an inlet damper in said second end;

an outlet damper in said first end; and a cross-sectional area which gradually increases from said first end to said second end.

36. The vertical wind tunnel amusement device as in claim 35 further comprising a plurality of return air ducts, each aerodynamically communicating with a fan and said plenum.

* * * * *